United States Patent [19]
Wehr et al.

[11] 3,770,266
[45] Nov. 6, 1973

[54] HANDLING SHEET MATERIAL

[75] Inventors: Robert L. Wehr, Harmony; Edward W. Rearick, Jr., Gibsonia; Lemuel R. McBride, Zelienople, all of Pa.

[73] Assignee: Billco Manufacturing Inc., Zelienople, Pa.

[22] Filed: Aug. 23, 1971

[21] Appl. No.: 173,906

[52] U.S. Cl. .................. 271/97, 271/30, 271/74, 271/109
[51] Int. Cl. .................................................. B65h 3/08
[58] Field of Search .................. 271/26, 30, 31, 39, 271/40, 74

[56] References Cited
UNITED STATES PATENTS
3,547,431   12/1970   Wagner ...................... 271/26 R X
3,633,902   1/1972    Warden ....................... 271/74 UX
3,395,943   8/1968    Wilde et al. ................. 271/74 X OTHER PUBLICATIONS
Anderson, T. H. & J. C. Baker. "Document Feeder and Separator." IBM Technical Disclosure Bulletin, Vol. 6, No. 2, 1963, p. 32,33.

Primary Examiner—Evon C. Blunk
Assistant Examiner—Bruce H. Stoner, Jr.
Attorney—Parmelee, Utzler & Welsh

[57] ABSTRACT

A method and apparatus for handling sheet material, such as glass sheets, is disclosed. A stack of sheet material is supported for movement in a generally upward direction towards driven friction rollers. The top sheet of the stack is separated from the next underlying sheet by a jet of fluid, such as air, coming from a nozzle arranged outside one of the edges of the top sheet. The jet of fluid is directed such that the edge of the top sheet will move upwardly and fluid will then flow between the two sheets to raise the top sheet upwardly until it engages the rollers. The top sheet is then transported by the rollers while riding on the cushion of fluid. Control means are provided for moving the stack of sheet material to position the top sheet of the stack for separation by the jet of fluid.

2 Claims, 8 Drawing Figures

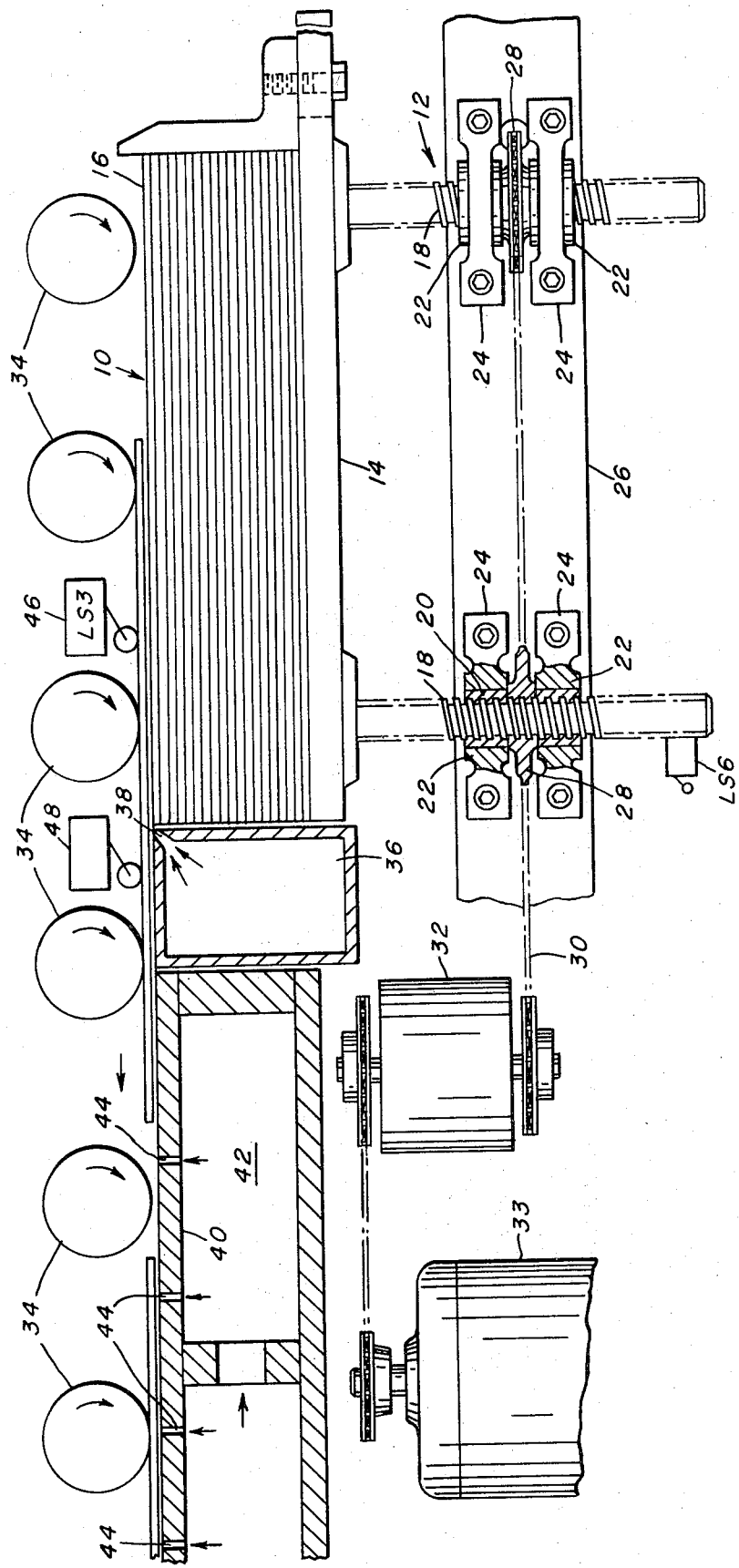

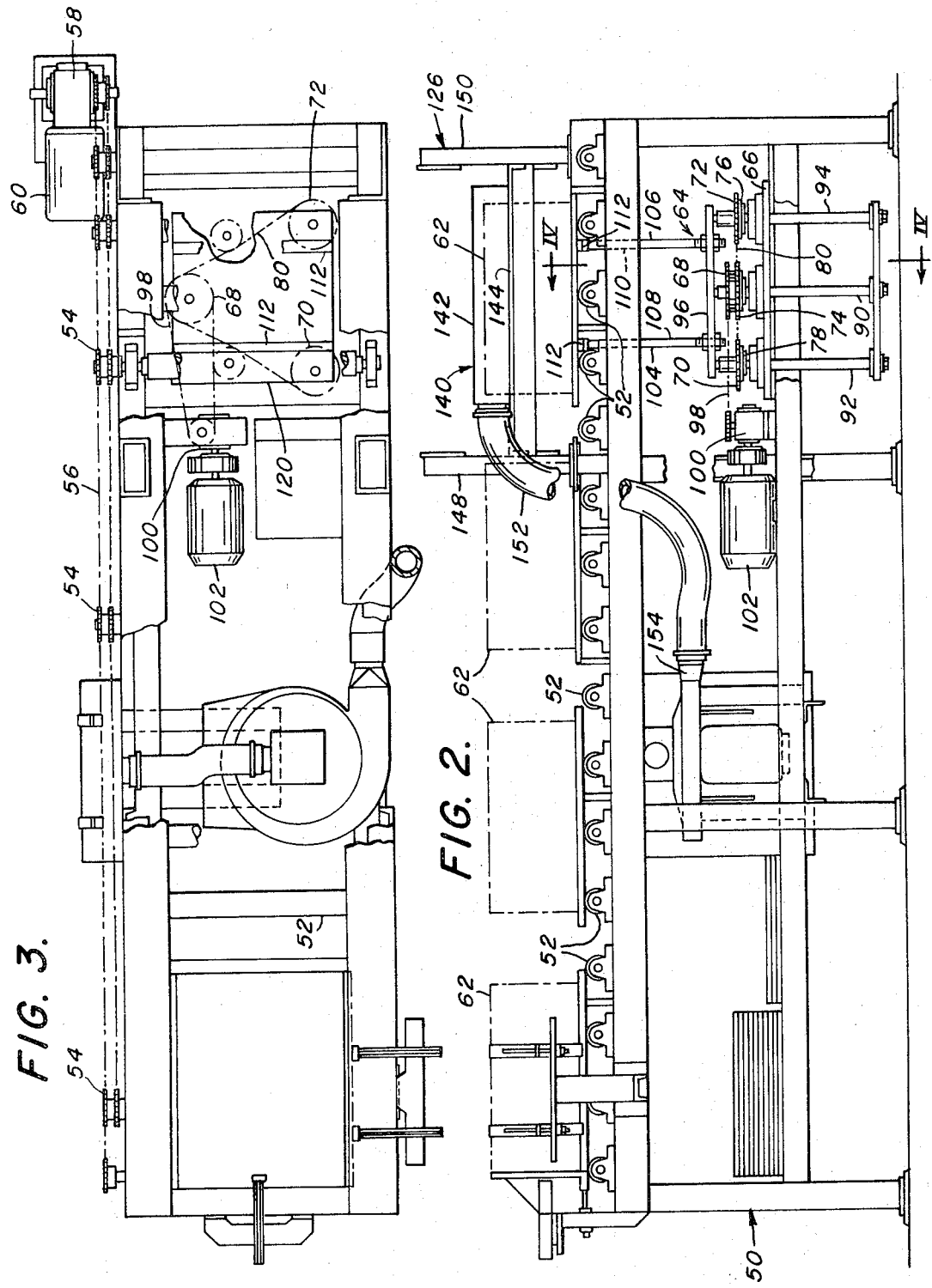

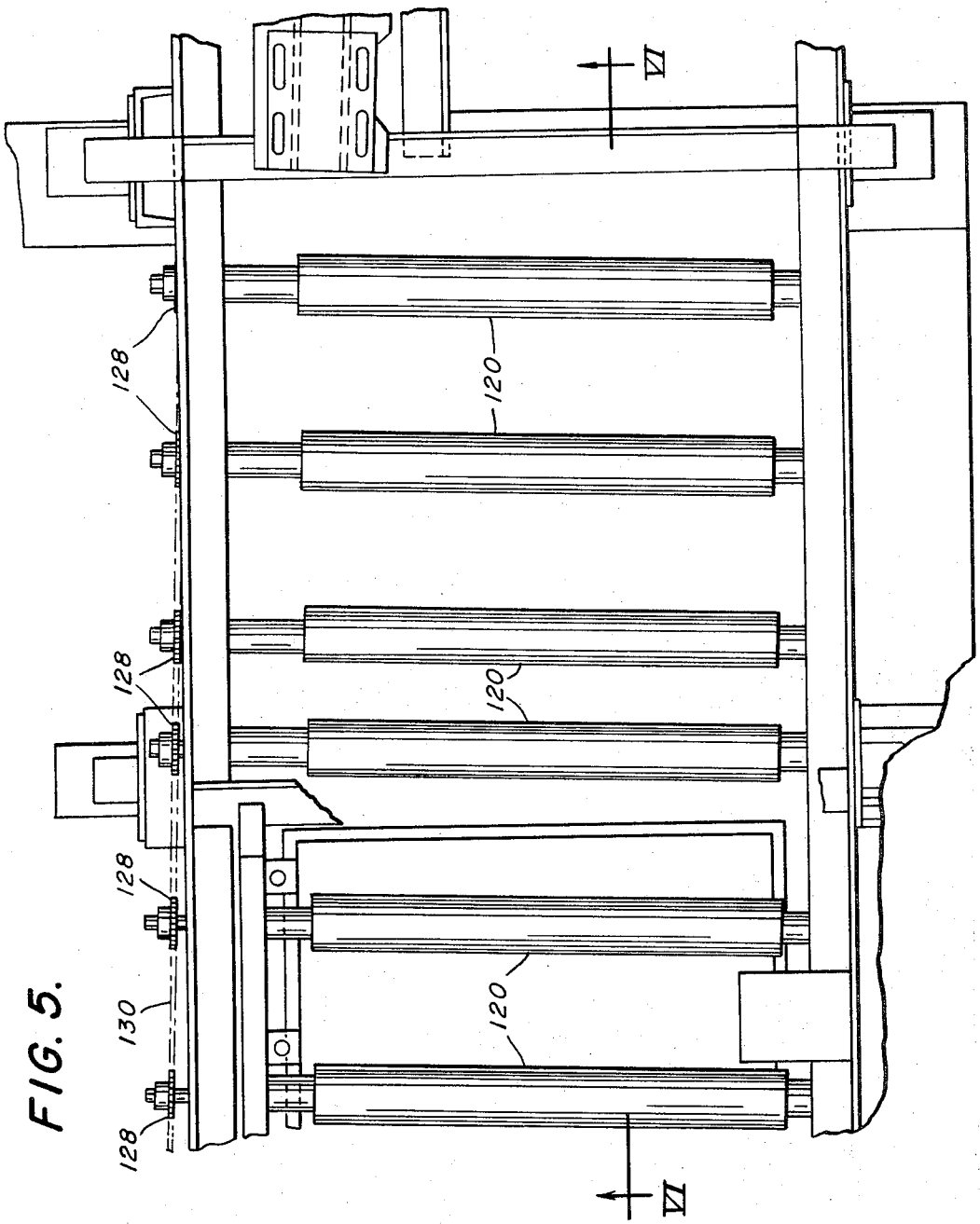

HANDLING SHEET MATERIAL

This invention relates to a method and apparatus for handling sheet material, and more particularly to a method and apparatus for separating the top sheet of a stack of sheet material, such as glass sheet for example, and transporting the thus separated top sheet away from the stack.

In handling stacks of sheet material, it is frequently necessary to separate the individual sheets for processing. Such is the case with stacks of glass sheet, for example, where the sheets are to be separated and transported for scoring and breaking. One way of separating and transporting glass sheets is to engage the top sheet of the stack with a vacuum cup-type unstacking device where the top sheet is held by suction, and to then lift or slide the top sheet off of the stack and carry it to a station for processing as desired. Vacuum cup-type unstacking devices are less than desireable in that they are slow in their operation since the device must first pick up the top sheet, then transport it to a next station, and finally return to the stack to repeat the cycle. An unnecessarily long time lag thus results between separation of sheets. Using multiple vacuum unstacking devices to speed the movement of the sheets results in a very complex and expensive system.

In addition to the above disadvantages, the vacuum cup-type unstacking device oftentimes leaves cup marks on the sheets. The marked sheets would have to be cleaned, thus adding to the processing costs of the sheets. Non-marking vacuum cups are available but are expensive and often not used because of their cost.

The present invention overcomes the above noted drawbacks of vacuum cup-type unstacking devices by providing a method and apparatus which is simply and inexpensively constucted, permits continuous separation and transportation of individual sheets, and avoids marking the sheets. More particularly, we provide an apparatus for handling sheet material preferably comprising: support means for supporting a stack of sheet material and for positioning the stack at a predetermined location; transport means constructed and arranged for engaging the top sheet of the stack to move same along a path away from the support means; fluid injection means constructed and arranged for directing a stream of fluid towards the leading edge of the top sheet of the stack in such a manner that the top sheet will be separated from the rest of the stack and fluid will flow between the top sheet and the sheet directly below to move the top sheet against the transport means; and control means for effecting relative movement between the support means and the fluid injection means to position the top sheet of the stack for separation by the fluid injection means. In the preferred embodiment of this invention, the fluid injection means includes an air nozzle arranged to direct a stream of air towards the leading edge of the top sheet of the stack, and the control means includes means for stopping the stack support when the top sheets engages the transport means and for again effecting the movement between the stack support and the fluid injection means when the sheet being transported reaches a predetermined downstream location. The transport means are described in the preferred embodiment as being driven rollers.

The method of the present invention, which may be performed by the apparatus just described as well as by other apparatus, preferably comprises the steps of: separating the top sheet of a stack of material by directing stream of fluid between the top sheet and the next underlying sheet in such a manner that the top sheet is raised generally upwardly and supported on a cushion of fluid; stopping the upward movement of the separated top sheet; and transporting the thus separated top sheet away from the stack.

Other details and advantages of this invention will become apparent as the following description of a present preferred embodiment thereof and a preferred method of practicing same proceeds.

In the accompanying drawings I have shown a present preferred embodiment of this invention and have illustrated a present preferred method of the same in which:

FIG. 1 is a side elevation view of a somewhat diagrammatic representation of an apparatus for handling sheet material embodying the present invention;

FIG. 2 is a side elevation view of an apparatus for handling sheet material embodying the present invention;

FIG. 3 is a plan view of the apparatus of FIG. 2;

FIG. 5 is a plan view of the downstream transport rollers forming part of the present invention;

Figure 4:
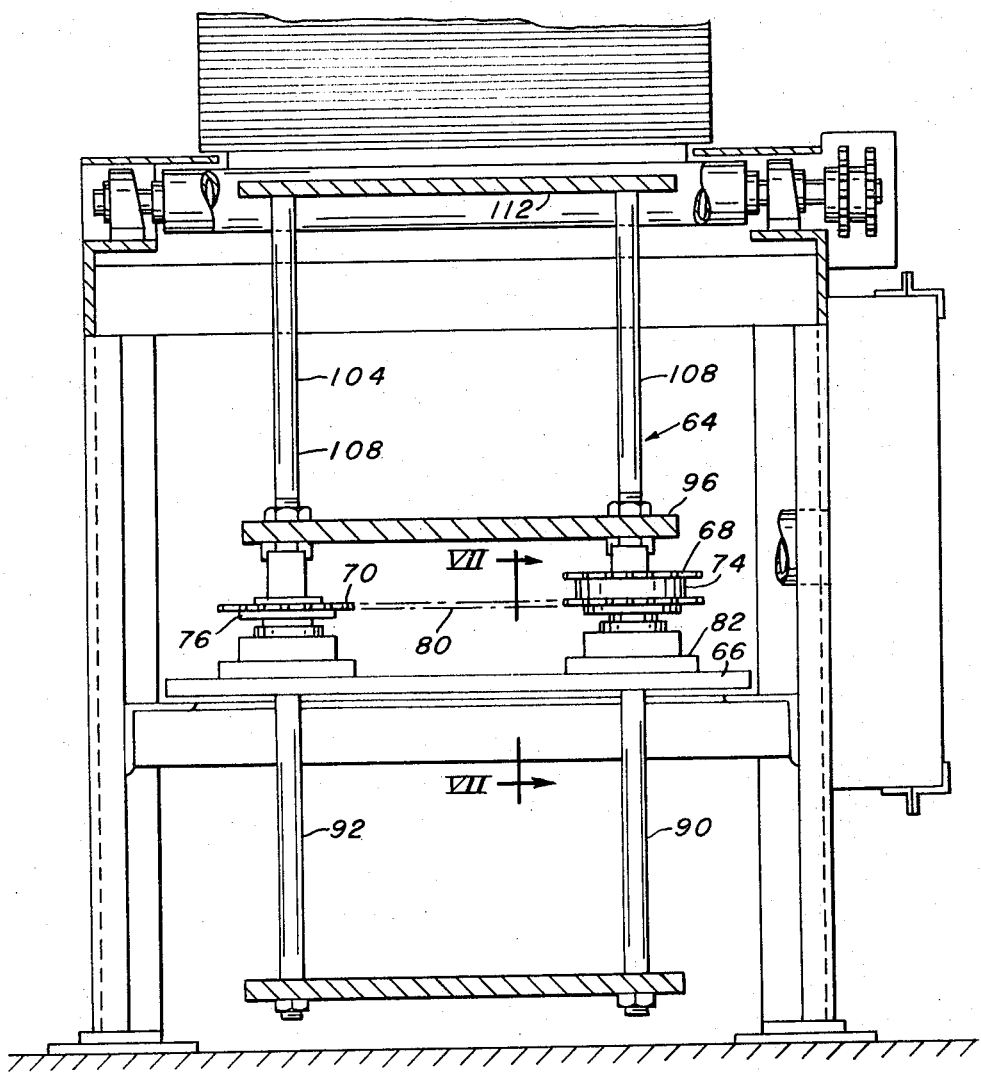
FIG. 4 is a sectional view looking along the line IV—IV of FIG. 2.

Referring now to the drawings, and especially to FIG. 1, there is shown an apparatus for handling a stack of sheet material such as glass sheet, although not limited thereto, such apparatus being designated generally by the numeral 10. The basic elements of apparatus 10 as shown generally diagrammatically in FIG. 1 include an elevator 12 having a flat, horizontally disposed base 14 for supporting a stack 16 of sheet glass. The base 14 is attached to non-rotating screws 18 extending downwardly from the base. A nut 20 is arranged on the threads of the screws 18 which nuts are arranged for rotation within bearings 22 mounted in housings 24 attached to a fixed frame 26. The nuts have sprockets 28 fixed to the external surface thereof. A roller chain 30 is operatively arranged on the sprockets 28 and the drive shaft of a speed reducer 32 which is driven by a motor 33. Thus, by operating motor 33, the elevator 12 may be moved upwardly or downwardly depending on the direction of rotation of the motor.

Arranged above the elevator 12 is a series of horizontally disposed rollers 34 connected with a motor drive, not shown, for synchronous rotation about the horizontal axes, and in a clockwise direction as indicated by the arrows shown in FIG. 1. The material of the outer surface of the rollers 34 has suitably frictional characteristics for enabling the rollers to engage a sheet of glass and to move same along a generally horizontal path and to the left of elevator 12 as viewed in FIG. 1. The top sheet of the stack 16 will move upwardly into engagement with the three rollers 34 shown directly above elevator 12 under the urging of an air stream discharging from an air injection means including an air manifold 36 arranged to the left or downstream of base 14 of elevator 12 which manifold is connected with a source of air, not shown. A nozzle 38 is formed at the upper right corner of the manifold 36 and is shaped to direct a stream or wedge of air at an angle to the horizontal towards the leading edge of the top sheet of the stack 16. The wedge of air from nozzle 38 will lift the left or leading edge of the top sheet of the stack 16. With the leading edge of the top sheet lifted, the air stream will flow between the top sheet and the next underlying sheet to thereby lift the top sheet upwardly into engagement with the rollers 34. The rollers 34 will move the separated top sheet to the left with the sheet being cushioned by air. The sheet will be moved downstream by the rollers 34 over a table 40 having an air chamber 42 below the top surface thereof. The air chamber 42 is connected with a source of air, not shown, and the table 40 is provided with suitable openings 44 communicating with the chamber whereby air will flow through the chamber and onto the top surface of the table to provide an air cushion for the downstream moving sheets.

The top sheet of the stack 16 will be separated when the elevator 12 positions the stack so that the leading edge of the top sheet is disposed at a position where the air stream from nozzle 38 is able to apply the necessary lifting force to the sheet. Control means, to be described in more detail later, are provided for regulating the movement of the elevator 12 for positioning the top sheets for separation. Part of the control means includes a limit switch 46 arranged so that the upward travel of the elevator 12 will be stopped when a top sheet is separated and engages the rollers 34 immediately above the elevator. When the sheet is moved downstream and clears the leading edge of the stack 16, the upward travel of the elevator 12 will begin again by virtue of the actuation of a second limit switch 48.

Referring now to FIG. 2, there is shown in more detail apparatus embodying the present invention. FIG. 2 shows a main frame 50 including interconnected horizontal and vertical structural members. A series of spaced, horizontally arranged, generally parallel rollers 52 are mounted on the main frame 50 to extend over the top of the structure. A sprocket 54 is fixed to one end of each of the rollers 52, as shown in FIG. 3, with all of the sprockets being operatively engaged by a drive chain 56. The chain 56 is driven directly by the output shaft of a speed reducer 58 coupled with a drive motor 60 connected to a source of electricity, not shown.

Figure 7:
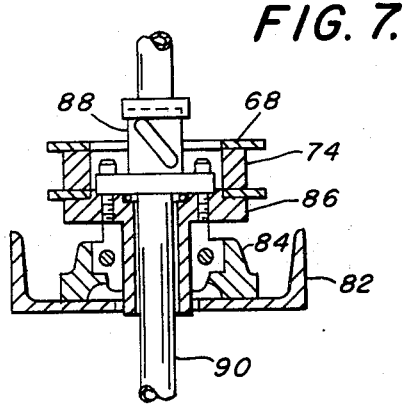
FIG. 7 is a sectional view of one of the sprockets forming part of the present invention and looking along the line VII—VII of FIG. 4.

Stacks 62 of glass sheet are transported by rollers 52 towards the right as viewed in FIGS. 2 and 3. A stack 62 will be engaged for upward movement by elevator 64 arranged at the right side of the main frame 50. Elevator 64 includes a horizontally arranged base member 66 fixed to the lower section of main frame 50, upon which base member is mounted sprocket assemblies 68, 70, and 72 arranged in a triangular pattern as clearly shown in FIG. 3. The sprocket assemblies 68, 70, and 72 include sprockets 74, 76, and 78, respectively, operatively engaged by a drive chain 80. Each of the sprocket assemblies is similarly constructed, with FIG. 7 showing details of sprocket assembly 68 with such details being essentially the same for all three assemblies. As shown in FIG. 7, sprocket assembly 68 includes a bearing support 82 fixed to the base member 66, a bearing 84 arranged on support 82, and a stub shaft 86 supported for rotation by the bearing 84. Sprocket 74 is fixed to stub shaft 86 as is internally threaded ball nut assembly 88. A screw shaft 90 extends through stub shaft 86 and ball nut assembly 88 with the threads of shaft 90 operatively engaging the threads of the ball nut assembly. Rotation of sprocket 74 will result in rotation of ball nut assembly 88 and the upward or downward translational movement of screw shaft 90 depending on the direction of rotation of the sprocket 74. The other two sprocket assemblies 70 and 72 have similarly arranged screw shafts 92 and 94, with the upper ends of all of the screw shafts extending through their respective ball nut assemblies 88 and are fixed to a flat horizontal plate 96. By rotating the sprockets 74, 76, and 78, the plate 96 will move upwardly or downwardly depending on the direction of rotation of the sprocket. Sprocket 74 differs from sprocket 76 and 78 in that it is provided with an upper set of teeth for operatively engaging drive chain 98 which is driven by the output shaft of speed reducer 100 which in turn is coupled to motor 102, both the speed reducer and motor being mounted on main frame 50 with the motor being connected with a source of electricity, not shown.

A pair of spaced, generally parallel yoke assemblies 104 and 106 is fixed to the upper surface of plate 96. Each yoke assembly 104 and 106 has a pair of vertical legs 108 and 110 fixed at their lower ends to plate 96 and at their upper ends to a horizontal crossbar 112. As shown in FIG. 2, the yoke assemblies 104 and 106 are spaced on plate 96 such that the legs 108 and 110 thereof lie in vertical planes extending between pairs of rollers 52. Thus, the yoke assemblies 104 and 106 will move between the rollers 52 whereby the crossbars 112 will engage a stack 62 of sheet glass positioned on the rollers 52 above the crossbars to carry the stack upwardly for separation of the top sheet of the stack and transportation of same away from the stack.

Figure 6:
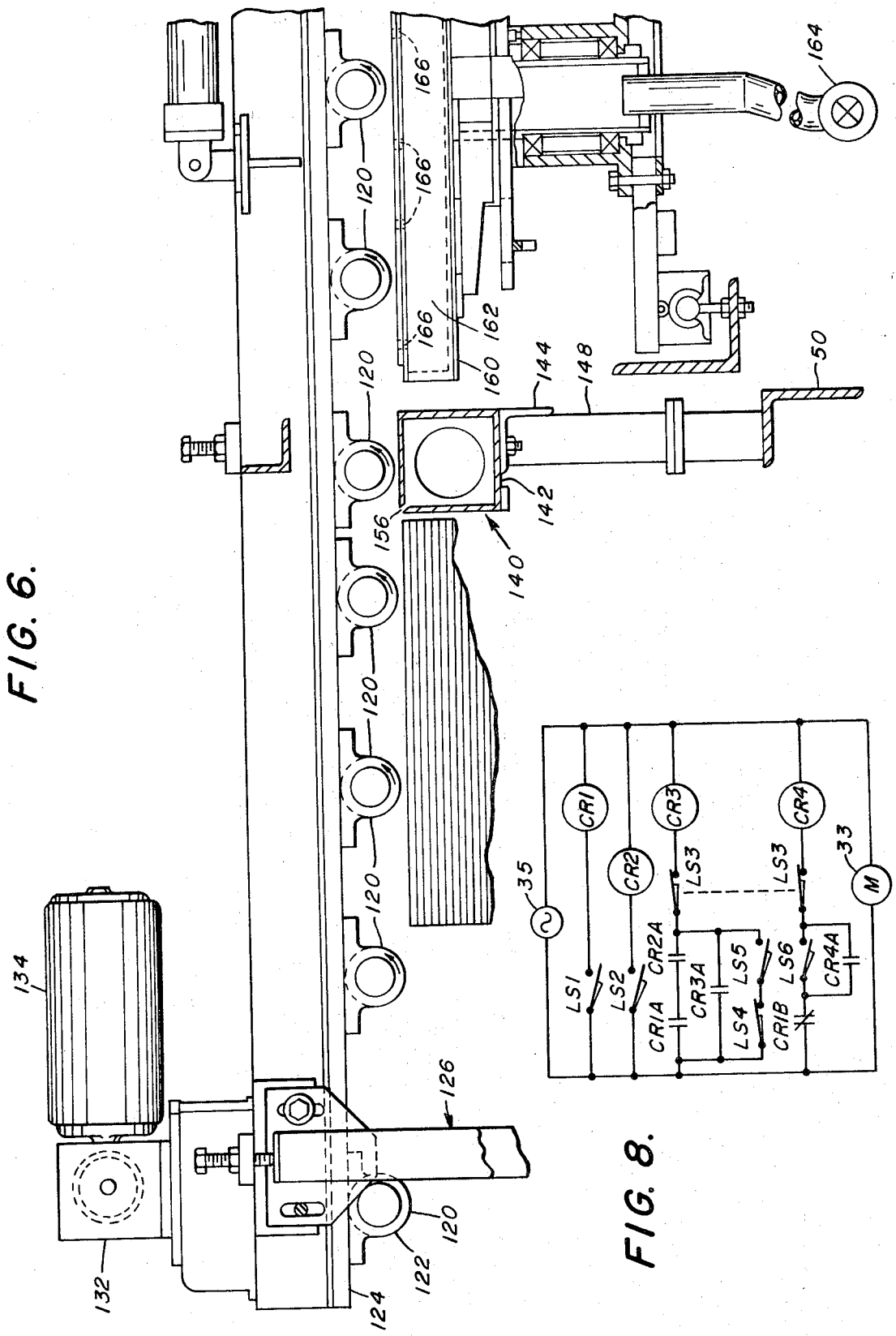
FIG. 6 is a sectional view looking along the line VI—VI of FIG. 5.

Disposed above the crossbars 112 is a series of spaced, horizontally disposed rollers 120 mounted for rotation in bearings 122, on of which is shown in FIG. 6, fixed to cross beam 124 forming part of the support frame structure generally designated by the numeral 126. Sprockets 128 are mounted on one end of the roller 120, the left end as viewed in FIG. 5, to which sprocket 128 is operatively connected a drive chain 130 which in turn is connected with the output shaft of speed reducer 132, shown in FIG. 6. The speed reducer 132 is coupled with motor 134 connected to a source of electricity, not shown. The rollers 120 are driven in a counter clockwise direction as viewed in FIG. 6, whereby sheets of glass engaged by the rollers will be moved to the right.

As shown in FIGS. 2 and 6, a fluid injection means generally designated by the numeral 140, is provided at the leading edges of the sheets comprising the stack 62. The fluid injection means 140 includes a hollow manifold 142 fixed to channel member 144 mounted to vertical members 148 and 150 forming part of the support frame structure 126 and secured to main frame 50. One end of manifold 142 is closed while the other end is open and connected with a flexible tubing 152 which in turn is connected with the outlet of motor driven blower 154. Air flowing from blower 154 enters manifold 142 and discharges therefrom through nozzle 156 at the upper left corner of the manifold as viewed in FIG. 6. Thus, when the top sheet of stack 62 is positioned in line with the stream or wedge of air flowing from the nozzle 156, the leading edge of the top sheet will lift and the air will flow between the top sheet and the next underlying sheet to urge the sheet into engagement with the rollers 120. The rollers 120 will then transport the sheet downstream to another station for further processing. The transported sheets will ride on a cushion of air much in the same manner as described previously with regard to the general structure illustrated in FIG. 1. Thus, a table 160 is provided having an air chamber 162 connected with a source of air such as a motor driven blower 164, with openings 166 being formed through the table whereby air will flow out to provide the air cushion for the sheets.

It has been found that a 21 inch × 21 inch × ⅛ inch sheet of glass will be lifted from a stack by a stream of air flowing through nozzle 156 directed upwardly at an angle of around 30 degrees to the horizontal, with the nozzle having a discharge opening at around 0.06 inch and the air being supplied by a 1/6 horsepower blower rated at 370 SCFM at 3,600 RPM with the air being at around 6 oz. pressure. The blower capacity and nozzle size can be readily varied to handle different sizes of sheets, as one skilled in the art would readily recognize.

Figure 8:
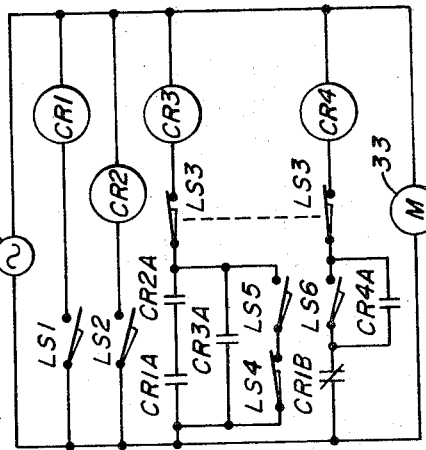
FIG. 8 is a schematic representation of a typical control circuit for use with the present invention.

A simplified representation of a control circuit for controlling the upward and downward movement of elevator 12 (see FIG. 1) is shown in FIG. 8. A source of electrical power 35 is applied across the branches of the control network. A normally open limit switch L.S. 1 is disposed to be actuated by the elevator 12 when the elevator is in the full down travel position ready to be loaded with a stack of glass sheets. When L.S. 1 is actuated, CR 1 is energized. Normally open limit switch L.S. 2 is disposed on the elevator 12 and is activated by the stack of glass sheets to indicate that the stack is in place on the elevator. L.S. 2 is used to energize CR 2. Normally closed limit switch L.S. 3 is disposed above the elevator 12 and is actuated by a glass sheet which is lifted into contact with rollers 34 by the air discharging from manifold 36. When the elevator 12 is loaded with a stack of glass sheets that are properly in place as indicated by limit switches L.S. 1 and L.S. 2 being closed, contacts CR 1A and CR 2A are closed, and with limit switch L.S. 3 being normally closed, control relay CR 3 is energized which in turn energizes motor 33 to raise elevator 12. Contact CR 3A locks in relay CR 3 until limit switch L.S. 3 is opened by being actuated by the glass sheet raised against rollers 34. The opening of limit switch L.S. 3 deenergizes relay CR 3 to stop motor 33 and thereby stopping elevator 12. Normally closed limit switch L.S. 4 and normally open limit switch L.S. 5 are disposed proximate the station (e.g. cutting table, not shown) to which the glass is transported by the rollers 34. When the glass sheet clears the station, limit switches L.S. 4 and L.S. 5 will be in a closed position to provide a path for energizing relay CR 3 to start motor 33 to again raise elevator 12. When the top glass sheet is lifted to contact limit switch L.S. 3 to open it, the elevator 12 will again be stopped.

When all of the glass sheets have been removed from elevator 12, limit switch L.S. 6 will be actuated by the elevator when it reaches its full upward travel position. When limit switch L.S. 3 returns to its normally closed position indicating that the glass sheet has passed onto a downstream station (e.g. cutting table) relay CR 4 is energized which in turn energizes the motor 33 to drive the elevator 12 downwardly. Contact CR 4A locks relay CR 4 until the elevator reaches its full down travel position, where limit switch L.S. 1 is again closed its open normally closed contacts CR 1B and stop the elevator. The elevator is again ready for reloading with a stack of glass sheets.

While we have shown and described a present preferred embodiment of this invention and have illustrated a certain present preferred method of practicing the same, it is to be distinctly understood that the invention is not limited thereto, but may be otherwise variously embodied and practiced within the scope of the following claims.

We claim:

1. Apparatus for handling sheet glass comprising:
   elevator means for supporting a stack of sheet glass and for selectively moving the stack in an upward direction;
   transport means comprising a series of spaced-apart rollers defining a generally horizontal path above and away from said elevator;
   fluid injection means constructed and arranged for directing a stream of fluid towards the leading edge of the top sheet of glass in the stack in such a manner that the top sheet will be separated from the rest of the stack and fluid will flow between the top sheet and the sheet directly below to lift the entire top sheet upwardly against the lower surfaces of the rollers positioned above the stack;
   fluid cushion producing means disposed along said generally horizontal path below the rollers of the transport means to support the top sheet of glass as it is transported horizontally away from the stack by said transport means; and
   control means for intermittently actuating the elevator means to raise the stack of glass to a level at which the fluid stream is directed at the leading edge of the top sheet of glass.

2. The apparatus of claim 1, wherein said control means include means for intermittently actuating the elevator means to raise the stack of glass when the sheet of glass being transported reaches a predetermined downstream location along said horizontal path.

* * * * *